(12) United States Patent
Jeong et al.

(10) Patent No.: US 11,118,015 B2
(45) Date of Patent: Sep. 14, 2021

(54) LAMINATE FOR MANUFACTURING FLEXIBLE SUBSTRATE AND METHOD FOR MANUFACTURING FLEXIBLE SUBSTRATE BY USING SAME

(71) Applicant: LG CHEM, LTD., Seoul (KR)

(72) Inventors: Hye Won Jeong, Daejeon (KR); Cheolmin Yun, Daejeon (KR); Kyungjun Kim, Daejeon (KR); Bora Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/461,619

(22) PCT Filed: Jan. 19, 2018

(86) PCT No.: PCT/KR2018/000879
§ 371 (c)(1),
(2) Date: May 16, 2019

(87) PCT Pub. No.: WO2018/143588
PCT Pub. Date: Aug. 9, 2018

(65) Prior Publication Data
US 2020/0062906 A1    Feb. 27, 2020

(30) Foreign Application Priority Data

Jan. 31, 2017  (KR) .................. 10-2017-0013739
Dec. 13, 2017  (KR) .................. 10-2017-0171572

(51) Int. Cl.
*C08G 73/14*   (2006.01)
*B32B 43/00*   (2006.01)
*C09D 179/08*  (2006.01)

(52) U.S. Cl.
CPC ............ *C08G 73/14* (2013.01); *B32B 43/006* (2013.01); *C09D 179/08* (2013.01)

(58) Field of Classification Search
CPC .......................... C09D 179/08; C08G 73/14
See application file for complete search history.

(56) References Cited

U.S. PATENT DOCUMENTS 9,166,191 B2   10/2015  Yoon
9,200,134 B2   12/2015  Liang
(Continued)

FOREIGN PATENT DOCUMENTS

CN   101959935 A    1/2011
CN   104231625 A   12/2014
(Continued)

OTHER PUBLICATIONS

Machine translation of WO 2016/152906, 2020 (Year: 2020).*
(Continued)

*Primary Examiner* — Liam J Heincer
(74) *Attorney, Agent, or Firm* — Rothwell, Figg, Ernst and Manbeck, P.C.

(57) ABSTRACT

The laminate for manufacturing a flexible substrate according to the present invention is formed by using a polyimide having a high absorbance to a UV laser in an organic sacrificial layer for delaminating a flexible substrate from a carrier substrate. Therefore, it is possible that the laser energy density required in the delaminating process using laser irradiation is reduced and the amount of as generated by the delaminating process is remarkably reduced so that the efficiency of the process, the permeability of the flexible substrate is improved and the reliability of the device is improved.

10 Claims, 2 Drawing Sheets

(56) References Cited

U.S. PATENT DOCUMENTS

| | | | |
|---|---|---|---|
| 9,611,358 B2* | 4/2017 | Jeong | B32B 3/16 |
| 9,614,190 B2 | 4/2017 | Ko et al. | |
| 10,035,883 B2* | 7/2018 | Jeong | B32B 17/064 |
| 10,414,869 B2* | 9/2019 | Jeong | B32B 27/36 |
| 2007/0161775 A1* | 7/2007 | Fang | C08G 73/10 |
| | | | 528/310 |
| 2009/0261062 A1 | 10/2009 | Kim | |
| 2011/0059305 A1 | 3/2011 | Kaneya et al. | |
| 2014/0042399 A1* | 2/2014 | Park | H01L 51/0097 |
| | | | 257/40 |
| 2014/0378588 A1 | 12/2014 | Liang | |
| 2015/0210048 A1* | 7/2015 | Jeong | B32B 37/26 |
| | | | 428/212 |
| 2015/0232621 A1* | 8/2015 | Jeong | B32B 27/286 |
| | | | 257/40 |
| 2015/0239210 A1* | 8/2015 | Jeong | B32B 27/06 |
| | | | 428/336 |
| 2015/0303408 A1 | 10/2015 | Lee et al. | |
| 2016/0071989 A1* | 3/2016 | Han | H01L 31/03926 |
| | | | 136/252 |
| 2017/0374737 A1* | 12/2017 | Jeong | H01L 31/0236 |
| 2018/0007799 A1* | 1/2018 | Jeong | H05K 3/38 |
| 2018/0039176 A1 | 2/2018 | Inoue et al. | |
| 2018/0334541 A1 | 11/2018 | Jeong et al. | |
| 2019/0010292 A1* | 1/2019 | Yun | C08G 73/1067 |
| 2019/0016849 A1* | 1/2019 | Yun | C08J 5/18 |
| 2019/0048141 A1* | 2/2019 | Yun | H01L 27/1218 |
| 2019/0276618 A1* | 9/2019 | Shin | C08K 5/5465 |
| 2019/0292138 A1* | 9/2019 | Yun | C07C 231/12 |
| 2019/0369496 A1* | 12/2019 | Kawabata | C08G 73/1067 |
| 2020/0385524 A1* | 12/2020 | Sohn | C08G 73/14 |

FOREIGN PATENT DOCUMENTS

| | | |
|---|---|---|
| CN | 104487241 A | 4/2015 |
| EP | 2248843 A1 | 11/2010 |
| JP | 2012-189974 A | 10/2012 |
| KR | 10-2014-0028890 A | 3/2014 |
| KR | 10-2014-0067528 A | 6/2014 |
| KR | 10-2014-0122204 A | 10/2014 |
| KR | 10-2014-0122205 A | 10/2014 |
| KR | 10-1500684 B | 3/2015 |
| KR | 10-2015-0078918 A | 7/2015 |
| KR | 10-2016-0065334 A | 6/2016 |
| KR | 10-1650223 B1 | 8/2016 |
| TW | 201534186 A | 9/2015 |
| WO | 2016-129546 A1 | 8/2016 |
| WO | 2016-152906 A1 | 9/2016 |
| WO | 2016-158672 A1 | 10/2016 |

OTHER PUBLICATIONS

Search Report issued for International Application No. PCT/KR2018/000879 dated May 8, 2018, 6 pages.

Search Report Issue for European Application No. 18748422.5 dated Feb. 10, 2020, 6 pages.

* cited by examiner

[Fig. 1]
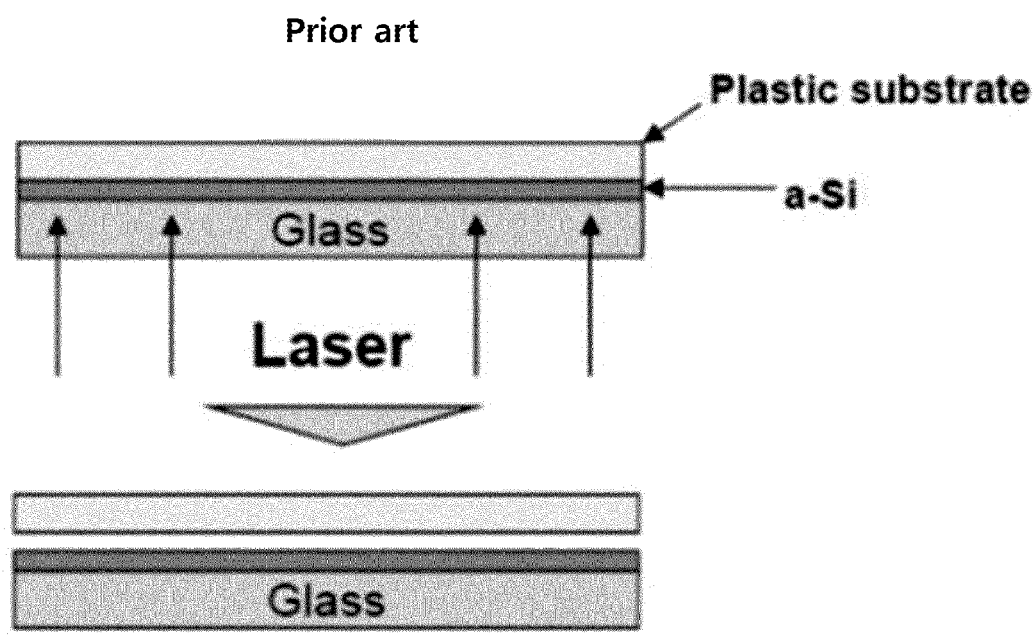

[Fig. 2]
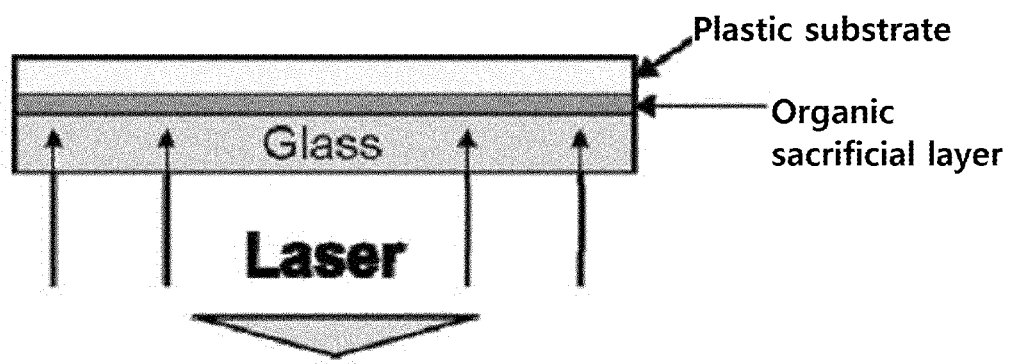
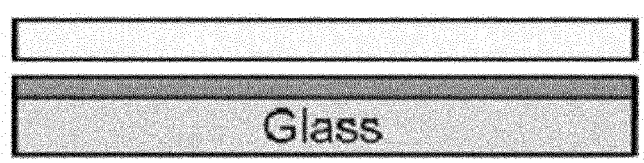
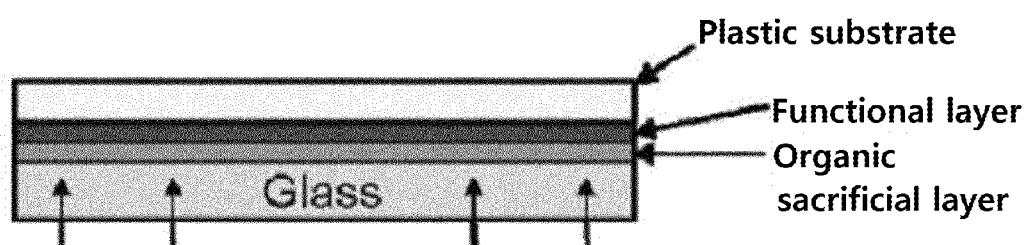
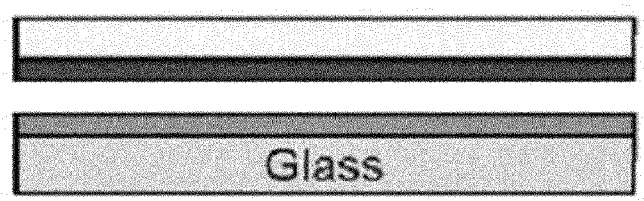

LAMINATE FOR MANUFACTURING FLEXIBLE SUBSTRATE AND METHOD FOR MANUFACTURING FLEXIBLE SUBSTRATE BY USING SAME

BACKGROUND OF THE INVENTION

1. Field of the Invention

This application is a 35 U.S.C. § 371 National Phase Entry Application from PCT/KR2018/000879, filed on Jan. 19, 2018, and designating the United States, which claims the benefit of priority to Korean Patent Application Nos. 10-2017-0013739, filed on Jan. 31, 2017 and 10-2017-0171572, filed on Dec. 13, 2017, the entire disclosures of which are incorporated herein by reference.

The present invention relates to a laminate for manufacturing a flexible substrate and a method for manufacturing a flexible substrate using the same.

2. Description of the Related Art

Polyimide (PI) is a polymer having a relatively low crystallinity or mostly amorphous structure. It is easy to be synthesized and prepared as a thin film. It is a polymer material having transparency, excellent heat resistance and chemical resistance due to a rigid chain structure, excellent mechanical and electrical properties and dimensional stability, as well as the advantage of not requiring a crosslinking group for curing. It is widely used in electric and electronic materials such as automotive, aerospace, flexible circuit boards, liquid crystal alignment films for LCD, adhesives and coatings.

However, although polyimide is a high-performance polymer material having high thermal stability, mechanical properties, chemical resistance, and electrical properties, it does not satisfy the colorless transparent property which is a basic requirement for use in the display, and has a problem that the coefficient of thermal expansion should be further lowered. For example, Kapton commercially available from DuPont has a coefficient of thermal expansion as low as about 30 ppm/° C., but this value does not meet the requirements of plastic substrates. Therefore, many researches have been carried out to minimize changes in optical characteristics and thermal history while maintaining the basic characteristics of polyimide.

In general, the aromatic polyimide has a deep brown color. The reason for this can be explained by the charge transfer complex (hereafter referred to as CT-complex) theory in which the $\pi$ electrons of benzene present in the imide main chain are generated by bonding between chains. This is because there are a electrons, $\pi$ electrons, and nonbonding non-covalent electron pairs in the imide structure and therefore electrons can be excited.

Generally polyimides absorb light in a visible light range from a wavelength of 400 nm or less to 500 nm, and thus have a yellow to red color. Therefore, in order to lower the CT-complex, which is a disadvantage of the aromatic polyimide, there is a method of restricting the movement of the $\pi$ electrons by introduction of an element having relatively high electronegativity such as trifluoromethyl (—$CF_3$), sulfone (—$SO_2$), and ether (—O—) into this main chain to lower the resonance effect. In addition, by introducing a cycloolefin structure other than benzene, the density of $\pi$ electrons present in the main chain can be reduced to produce a colorless transparent polyimide film.

On the other hand, polyamide-imides have been widely used as an industrial material for electric, electronic, mechanical, aeronautic fields, etc., due to their excellent heat resistance, mechanical strength and electrical characteristics. It is also known that polyamideimides differ in structure from general polyimides and are soluble in organic solvent. Polyamideimides are also used for enamel varnishes, coatings for electric insulation, paints and the like for which solution molding is essentially involved.

However, it is still necessary to develop a polymer for a flexible display having a lower coefficient of thermal expansion and high solubility, transparency and thermal stability in order to be used in the display field.

SUMMARY OF THE INVENTION

A problem to be solved by the present invention is to provide a laminate for manufacturing a flexible substrate which is easy to be delaminated by a laser.

Other problem to be solved by the present invention is to provide a method for manufacturing a flexible substrate using the laminate.

To solve the problems of the present invention, there is a laminate for manufacturing a flexible substrate comprising:

a carrier substrate;

an organic sacrificial layer disposed on one side of the carrier substrate and containing a polyimide resin having an amide bond (—C(O)NH—) in the molecular structure; and a flexible substrate layer disposed on the organic sacrificial layer, wherein the adhesion of the organic sacrificial layer to the carrier substrate is reduced by a UV laser.

According to one embodiment, the organic sacrificial layer containing the polyimide resin may have a UV transmittance of 30% or less at a wavelength of 200 nm to 350 nm when the thickness is 100 nm.

According to one embodiment, the polyimide may be a polyimide prepared from a polymerizable component comprising at least one diamine selected from the following formulae 3a to 3c and tetracarboxylic anhydride.

[Formula 3a]

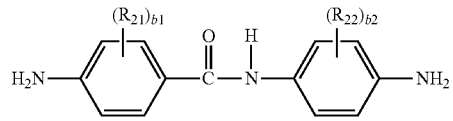

[Formula 3b]

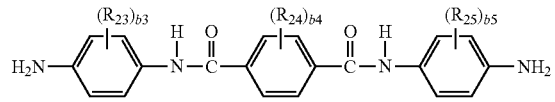

-continued

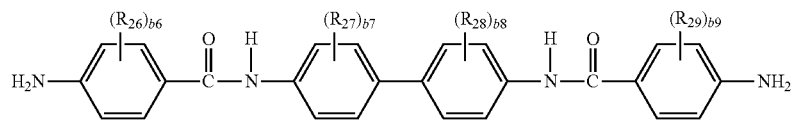

[Formula 3c]

In formulae 3a to 3c, $R_{21}$ to $R_{29}$ are each independently a substituent selected from a halogen atom, a hydroxyl group (—OH), a thiol group (—SH), a nitro group (—NO$_2$), a cyano group (—CN), an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, and $b_1$ to $b_9$ are each independently an integer of 0 to 4.

According to one embodiment, the polyimide contained in the carrier substrate may comprise a repeating structure selected from the following formulae 4a to 4c.

According to one embodiment, the polyimide contained in the organic sacrificial layer may have a coefficient of thermal expansion (CTE) of 0 to 20 ppm/° C. in the temperature range of 30 to 500° C.

According to one embodiment, the flexible substrate may contain a polyimide.

According to one embodiment, the polyimide contained in the flexible substrate may be prepared from a polymerizable component further comprising a diamine of the following formula 5.

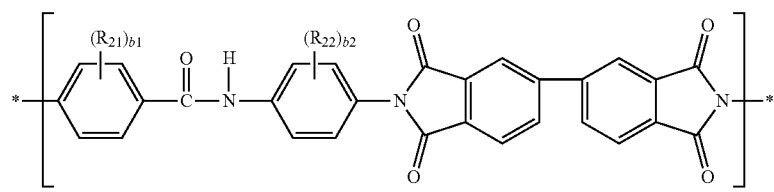

[Formula 4a]

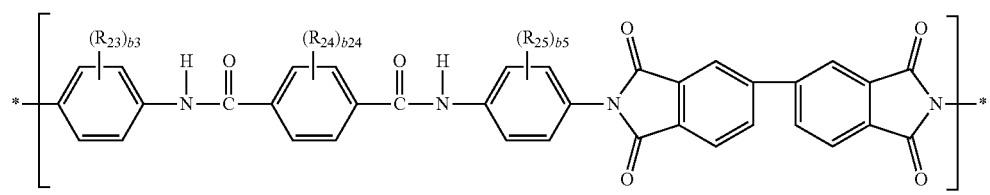

[Formula 4b]

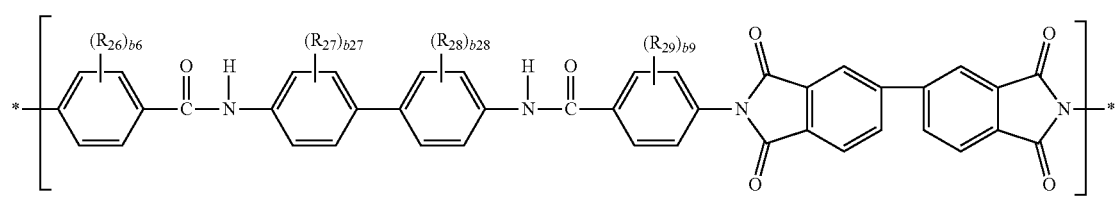

[Formula 4c]

In the formulae, $R_{21}$ to $R_{29}$ are each independently a substituent selected from a halogen atom, a hydroxyl group (—OH), a thiol group (—SH), a nitro group (—NO$_2$), a cyano group (—CN), an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, and $b_1$ to $b_9$ are each independently an integer of 0 to 4.

According to one embodiment, the laminate may further comprise at least one functional additional layer (functional layer) selected from a barrier layer and a metal layer on the organic sacrificial layer.

According to one embodiment, the energy density (E/D) of a UV laser at which the adhesion of the organic sacrificial layer to the carrier substrate changes may be 230 mJ/cm$^2$ or less.

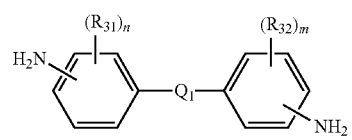

[Formula 5]

In formula 5, $R_{31}$ and $R_{32}$ are each independently a substituent selected from a halogen atom, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, n and m are each independently an integer of 0 to 4, and $Q_1$ is selected from the group consisting of a single bond, —O—, —CR$_{18}$R$_{19}$—, —C(═O)—, —C(═O)O—, —C(=O)NH—, —S—, —SO$_2$—, a phenylene group and a combination thereof, wherein R$_{18}$ and R$_{19}$ are each independently selected from the group consisting of a hydrogen atom, an alkyl group having 1 to 10 carbon atoms, and a fluoroalkyl group having 1 to 10 carbon atoms.

According to one embodiment, the polyimide contained in the flexible substrate may comprise a repeating structure represented by the following formula 7.

[Formula 7]

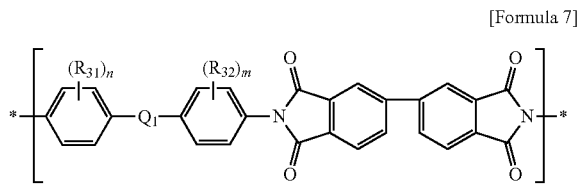

To solve other problem of the present invention, there is provided a method of manufacturing a flexible substrate, comprising the steps of:

applying and coating a polyimide precursor solution on a carrier substrate to form an organic sacrificial layer containing a polyimide;

forming a flexible substrate layer on the organic sacrificial layer; and laser lift-off for delaminating the flexible substrate layer from the carrier substrate on which the organic sacrificing layer is formed by using a UV laser.

According to one embodiment, the method may further comprise forming at least one functional additional layer selected from a barrier layer and a metal layer on the organic sacrificial layer.

Effect of the Invention

According to the present invention, on the carrier substrate an organic sacrificial layer containing a polyimide resin of which adhesive force is changed by a UV laser is formed, so that the flexible substrate can be easily delaminated from the carrier substrate by irradiating with a UV laser. In addition, since the polyimide according to the present invention has a high absorbance to a UV laser, the laser energy density required in the delaminating process using laser irradiation is small. Therefore, the amount of ash generated by the delaminating process is remarkably reduced so that the efficiency of the process and the reliability of the manufactured device can be further improved.

BRIEF DESCRIPTION OF THE DRAWINGS

FIG. 1 shows a method of manufacturing a flexible substrate using a conventional laser process.

FIG. 2 shows a method of manufacturing a flexible substrate using a laser process according to the present invention.

DETAILED DESCRIPTION OF THE INVENTION

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description, well-known functions or constructions are not described in detail if it is determined that they may obscure the gist of the present invention.

In the present disclosure, all the compounds or organic groups may be substituted or unsubstituted, unless otherwise specified. Herein, the term "substituted" means that at least one hydrogen contained in a compound or an organic group is substituted with a substituent selected from the group consisting of a halogen atom, an alkyl group having 1 to 10 carbon atoms, a halogenated alkyl group, a cycloalkyl group having 3 to 30 carbon atoms, an aryl group having 6 to 30 carbon atoms, a hydroxyl group, an alkoxy group having 1 to 10 carbon atoms, a carboxylic group, an aldehyde group, an epoxy group, a cyano group, a nitro group, an amino group, a sulfonic group or a derivative thereof.

In the present disclosure, unless otherwise specified, the term "a combination thereof" means two or more functional groups are bonded to each other via a linkage such as a single bond, a double bond, a triple bond, an alkylene group having 1 to 10 carbon atoms (e.g., a methylene group (—CH$_2$—) an ethylene group (—CH$_2$CH$_2$—), etc.), a fluoroalkylene group having 1 to 10 carbon atoms (e.g., a fluoromethylene group (—CF$_2$—), a perfluoroethylene group (—CF$_2$CF$_2$—), etc.), a hetero atom such as N, O, P, S or Si, or a functional group containing hetero atom (e.g., a heteroalkylene group containing a carbonyl group (—C(=O)—), an ether group (—O—), an ester group (—COO—), —S—, —NH— or —N=N—, etc. in the molecule), or two or more functional groups are condensed and linked.

In general, flexible displays are implemented by applying OLED technology to plastic substrates that replace glass substrates.

In all display fabrication processes, a device is coated/deposited on a carrier substrate (e.g., glass substrate), assembled on the carrier substrate via TFT and modulation processes, and finally the completed device is delaminated from the carrier substrate via a laser lift-off (LLO) process.

The LLO characteristic varies depending on the laser wavelength and the kind of a material for a plastic substrate. The processability depends on the amount of laser energy density (E/D) required for delaminating the plastic substrate from the carrier substrate or the amount of ash generated during delaminating. Therefore, in order to be used as a flexible substrate material, heat resistance and transmittance as well as laser characteristics are important factors.

The higher the absorbance of the flexible substrate formed on the substrate with respect to the laser wavelength used for delamination, the less energy required for delamination. Delamination is caused by the reduction of the adhesive force due to deterioration of the flexible substrate while the laser energy absorbed in the flexible substrate layer is converted into thermal energy. Therefore, ash is inevitably generated. The ash thus generated is distributed overall on the back side of the flexible substrate, which may lead to reduced film permeability, smearing, and reliability problems of the device in future.

The present invention relates to a laminate for manufacturing a flexible substrate, which comprises an organic sacrificial layer including a polyimide resin between a flexible substrate and a carrier substrate.

The laminate for manufacturing a flexible substrate according to the present invention comprises:

a carrier substrate;

an organic sacrificial layer disposed on one side of the carrier substrate and containing a polyimide resin having an amide bond (—C(O)NH—) in the molecular structure; and a flexible substrate layer disposed on the organic sacrificial layer, wherein the adhesion of the organic sacrificial layer to the carrier substrate is reduced by a UV laser.

FIG. 1 shows a method of manufacturing a flexible substrate using a conventional laser process. As shown in FIG. 1, conventionally, an inorganic sacrificial layer is formed between a flexible substrate layer including a plastic substrate and a glass substrate, and the flexible substrate layer is delaminated using a laser irradiation process to manufacture a flexible substrate. However, in the case of the inorganic sacrificial layer, since the absorbance of the inorganic sacrificial layer to the laser wavelength used for the irradiation process (for example, the laser of the wavelength of 308 nm) is high, the energy density of the laser required for the irradiation process is high (for example, 260 290 mJ). Therefore, there is a problem that the flexible film is damaged, and typically ash due to the deterioration of the flexible substrate is generated, which may deteriorate reliability and implementation of image quality of the device.

On the other hand, as shown in FIG. 2, in the manufacturing process using the laminate for manufacturing a flexible substrate according to the present invention, by forming the organic sacrificial layer having high absorbance to the laser wavelength used in the laser irradiation process, the carrier substrate and the flexible substrate layer can be separated at a remarkably low energy density.

According to one embodiment, the organic sacrificial layer containing the polyimide resin may have a transmittance of 30% or less with respect to a UV laser having a wavelength of 200 to 350 nm when the thickness is 100 nm. For example, a transmittance with respect to a UV laser having a wavelength of 308 nm may be 30% or less.

The present invention has low transmittance to UV laser, which means that the absorbance to the UV laser is high, the energy required for delaminating is reduced and the occurrence of ash is reduced, thereby improving process efficiency and reliability of device.

According to one embodiment, the energy density (E/D) of the UV laser at which the adhesion force of the organic sacrificial layer to the flexible substrate changes during UV irradiation may be 230 mJ/cm$^2$ or less, preferably 220 mJ/cm$^2$ or less.

The thickness of the polyimide film used for the organic sacrificial layer may be 10 to 200 nm, preferably 10 to 100 nm, more preferably 10 to 80 nm, or 10 to 70 nm or 10 to 60 nm or 10 to 50 nm. The delaminating by the laser can be efficiently performed in the above thickness range.

According to one embodiment, the polyimide contained in the organic sacrificial layer may have a coefficient of thermal expansion (CTE) of 0 to 20 ppm/° C. in a temperature range of 30 to 500° C. For example, the coefficient of thermal expansion (CTE) may be 0 to 20 ppm/° C., preferably 0 to 15 ppm/° C., after the heating and cooling processes are repeated n+1 times (n is an integer of 0 or more) in the range of 100 to 300° C.

According to one embodiment, the laminate may further comprise a functional layer such as a functional barrier layer and a metal layer on the organic sacrificial layer.

According to one embodiment, the flexible substrate layer may contain at least one selected from polyethylene terephthalate, polyethylene, polystyrene, polycarbonate, polyimide, polyamideimide, polyamide, and the like, and preferably at least one selected from polyimide, polyamideimide, polyamide, and the like.

The present invention provides a method for manufacturing a flexible substrate using the above-described laminate.

The method for manufacturing a flexible substrate according to the present invention comprises the steps of:

applying and coating a polyimide precursor solution on a carrier substrate and imidizing the polyimide precursor solution to form a sacrificial layer containing a polyimide;

forming a flexible substrate layer on the organic sacrificial layer; and laser lift-off for delaminating the flexible substrate layer from the carrier substrate on which the organic sacrificing layer is formed by using a UV laser.

The wavelength of the UV laser during the laser lift-off process may be 200 to 350 nm, preferably 250 to 330 nm, and the energy density (E/D) may be 230 mJ/cm$^2$ or less, preferably 220 mJ/cm$^2$ or less.

According to one embodiment, the manufacturing method may further comprise a step of forming a functional additional layer including a barrier layer or a metal layer on the organic sacrificial layer.

For example, the barrier layer may refer to a layer having a function of preventing permeation of oxygen, moisture, nitrogen oxides, sulfur oxides or ozone in the atmosphere. The material of the barrier layer may be a material having a function of preventing substances, such as moisture and oxygen, which accelerates the deterioration of the device from entering the device. For example, a metal such as In, Sn, Pb, Au, Cu, Ag, Al, Ti, and Ni; a metal oxide such as TiO, $TiO_2$, $Ti_3O_3$, $Al_2O_3$, MgO, SiO, $SiO_2$, GeO, NiO, CaO, BaO, $Fe_2O_3$, $Y_2O_3$, $ZrO_2$, $Nb_2O_3$ and $CeO_2$; a metal nitride such as SiN; a metal oxynitride such as SiON; metal fluorides such as $MgF_2$, LiF, $AlF_3$ and $CaF_2$; polyethylene, polypropylene, polymethylmethacrylate, polyimide, polyurea, polytetrafluoroethylene, polychlorotrifluoroethylene, polydichloro difluoroethylene, or a copolymer of chlorotrifluoroethylene and dichlorodifluoroethylene; a copolymer obtained by copolymerization of a comonomer mixture containing at least one comonomer and tetrafluoroethylene; a fluorine-containing copolymer having a cyclic structure in a copolymerized main chain; an absorbent material having a absorbance of 1% or more; and a water-proof material having a water absorption coefficient of 0.1% or less.

The material of the barrier layer may be a metal oxide, for example, a metal oxide of high refractive index. Accordingly, the refractive index of the barrier layer may be about 1.45 or more, about 1.5 or more, about 1.6 or more, about 1.65 or more, or about 1.7 or more, for example, with respect to the wavelength of 633 nm. The upper limit of the refractive index of the barrier layer can be appropriately adjusted according to the desired function. For example, the refractive index to the wavelength of 633 nm may be 2.6 or less, 2.3 or less, 2.0 or less, or 1.8 or less.

According to one embodiment, the barrier layer may be a single layer structure or a multi-layer structure. For example, the barrier layer may be a multi-layer structure in which an $Al_2O_3$ layer and a $TiO_2$ layer are sequentially laminated.

The thickness of the barrier layer is not particularly limited and may be appropriately selected depending on the intended use. In one example, the thickness of the barrier layer may be from 5 nm to 1000 nm, from 7 nm to 750 nm, or from 10 nm to 500 nm. When the thickness of the barrier layer satisfies the above numerical range, a barrier function for preventing permeation of oxygen and moisture in the atmosphere is sufficient, and transparency of the transparent substrate can be maintained with an appropriate light transmittance.

The light transmittance of the barrier layer is not particularly limited and may be appropriately selected depending on the intended use. In one example, the light transmittance of the barrier layer may be at least about 80%, at least 85%, or at least 90%.

The metal layer may be a layer in which metal wires or a plurality of metal patterns are formed, and the pattern of the metal mesh layer may be a shape selected from the group consisting of circular, oblique, polygonal shapes with 3 sides or more, and amorphous shapes. The material of the metal layer may be at least one conductive metal selected from the group consisting of silver (Ag), gold (Au), copper (Cu), and aluminum (Al).

According to one embodiment, the method may further comprise removing the organic sacrificial layer, after the laser lift-off process.

According to one embodiment, the organic sacrificial layer may be formed by a method comprising the steps of:
applying a polyimide precursor solution on a carrier substrate; and
imidizing the applied polyimide precursor solution by heat treatment to prepare an organic sacrificial layer.

The polyimide precursor solution according to the present invention comprises a polyamic acid prepared by polymerizing at least one diamine and at least one tetracarboxylic dianhydride and an organic solvent.

According to one embodiment, the above-described tetracarboxylic dianhydride is a tetracarboxylic dianhydride comprising a tetravalent aromatic, alicyclic or aliphatic organic group or a combination thereof, wherein the tetravalent aliphatic, alicyclic or aromatic organic groups are linked each other via a crosslinkage. For example, it may be a tetracarboxylic dianhydride comprising a tetravalent organic structure selected from the group consisting of tetravalent organic groups represented by the following formulae (1a) to (1e) and a combination thereof.

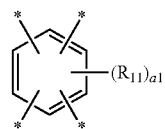
[Formula 1a]

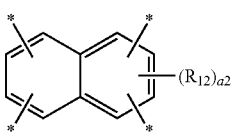
[Formula 1b]

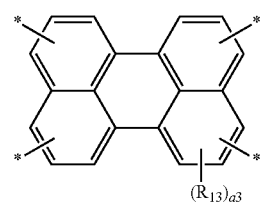
[Formula 1c]

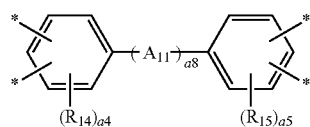
[Formula 1d]

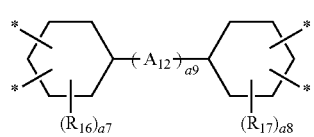
[Formula 1e]

In formulae 1a to 1e,
$R_{11}$ to $R_{17}$ may be each independently a substituent selected from a halogen atom selected from —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, a1 may be an integer of 0 to 2, a2 may be an integer of 0 to 4, a3 may be an integer of 0 to 8, a4 and a5 may be each independently an integer of 0 to 3, a6 and a9 may be each independently an integer of 0 to 3, and a7 and a8 may be each independently an integer of 0 to 9, and $A_{11}$ and $A_{12}$ may be each independently selected from the group consisting of a single bond, —O—, —CR$_{18}$R$_{19}$—, —C(=O)—, —C(=O)NH—, —S—, —SO$_2$—, a phenylene group and a combination thereof, wherein $R_{18}$ and $R_{19}$ may be each independently selected from the group consisting of a hydrogen atom, an alkyl group having 1 to 10 carbon atoms, and a fluoroalkyl group having 1 to 10 carbon atoms.

For example, the tetracarboxylic dianhydride used in the present invention may include, but is not limited to, tetracarboxylic dianhydride containing a tetravalent organic group selected from the group consisting of the following formulae 2a to 2r in the structure.

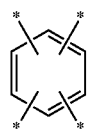
(2a)

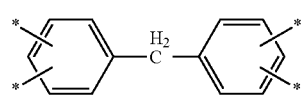
(2c)

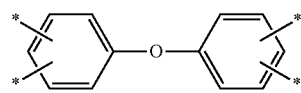
(2e)

-continued

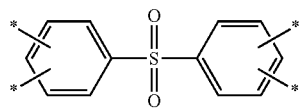 (2g)

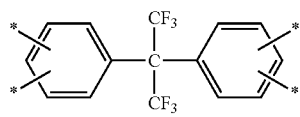 (2i)

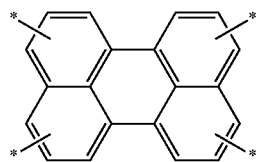

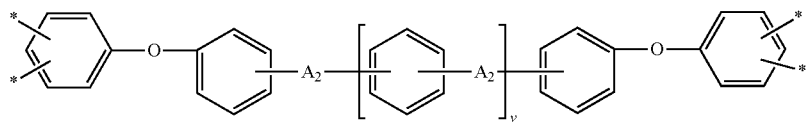 (2m)

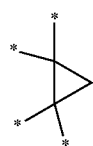

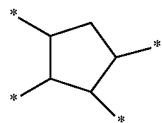 (2o)

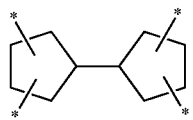 (2q)

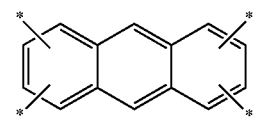 (2h)

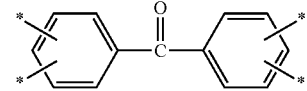 (2j)

(2k)

(2l)

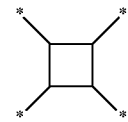 (2n)

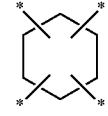 (2p)

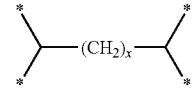 (2r)

In formula 21, $A_2$ may be selected from the group consisting of a single bond, —O—, —C(=O)—, —C(=O)NH—, —S—, —SO$_2$—, a phenylene group and a combination thereof and v is an integer of 0 or 1, and in formula 2r, x is an integer of 1 to 10.

In addition, at least one hydrogen atom present in the tetravalent organic group of formulae 2a to 2r may be substituted with a substituent selected from a halogen atom selected from —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms.

According to one embodiment, the diamine used for preparing the polyimide of the organic sacrificial layer may comprise any one selected from diamines of the following formulae 3a to 3c.

[Formula 3a]

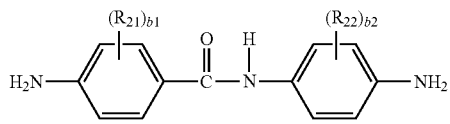

[Formula 3b]

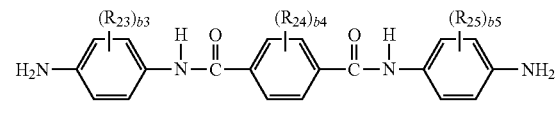

[Formula 3c]

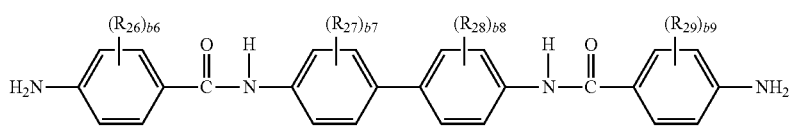

In formulae 3a to 3c, $R_{21}$ to $R_{29}$ are each independently a substituent selected from a halogen atom selected from —F, —Cl, —Br and —I, a hydroxyl group (—OH), a thiol group (—SH), a nitro group (—NO$_2$), a cyano group (—CN), an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, and $b_1$ to $b_9$ are each independently an integer of 0 to 4.

According to one embodiment, the polyimide included in the organic sacrificial layer may comprise one or more repeating structures selected from the following formulae (4a) to (4c).

In formula 5, $R_{31}$ and $R_{32}$ are each independently a substituent selected from a halogen atom selected from —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms, n and m are each independently an integer of 0 to 4, and $Q_1$ is selected from the group consisting of a single bond, —O—, —CR$_{18}$R$_{19}$—, —C(=O)—, —C(=O)O—, —S—, —SO$_2$—, a phenylene group and a combination thereof, wherein $R_{18}$ and $R_{19}$ are each independently selected from the group consisting of a hydrogen atom, an alkyl group having 1 to 10 carbon atoms, and a fluoroalkyl group having 1 to 10 carbon atoms.

[Formula 4a]

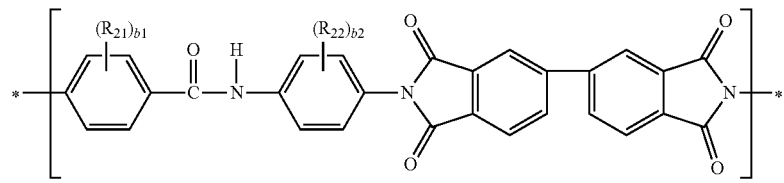

[Formula 4b]

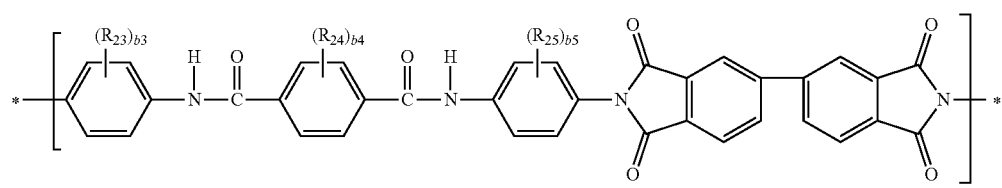

[Formula 4c]

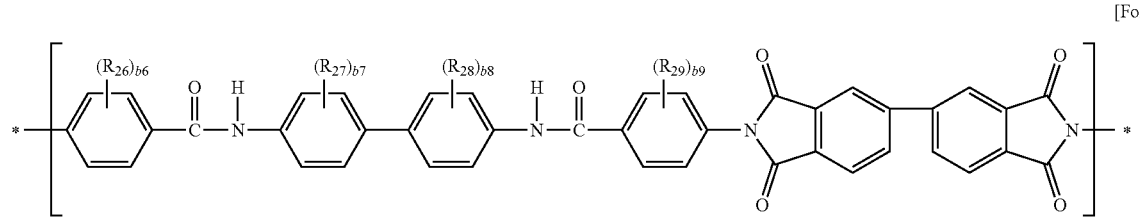

The symbols in formulae 4a to 4c are the same as those defined in formulae 3a to 3c.

By including the repeating structures as described above, it is possible to provide a polyimide having improved heat resistance in a high-temperature process, for example, little change such as shrinkage or expansion due to heat in a high-temperature process. In addition, although the absorbance of UV energy is increased and the irradiated laser has a low energy density, the separation between the organic sacrificial layer and the flexible substrate can be easily occurred.

According to one embodiment, the flexible substrate may contain a polyimide.

According to one embodiment, the polyimide contained in the flexible substrate may be prepared from a polymerizable component further comprising a diamine of the following formula (5).

According to one embodiment, as the diamine used in the production of the polyimide contained in the flexible substrate, a diamine containing a divalent organic group selected from the group consisting of the following formulae (6a) to (6t) in the structure may be further used, but not limited thereto.

[Formula 5]

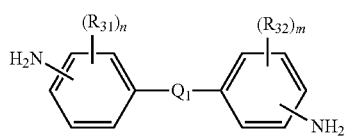

(6a)

(6b)

(6c)

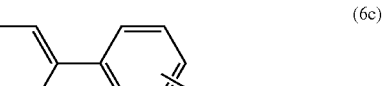

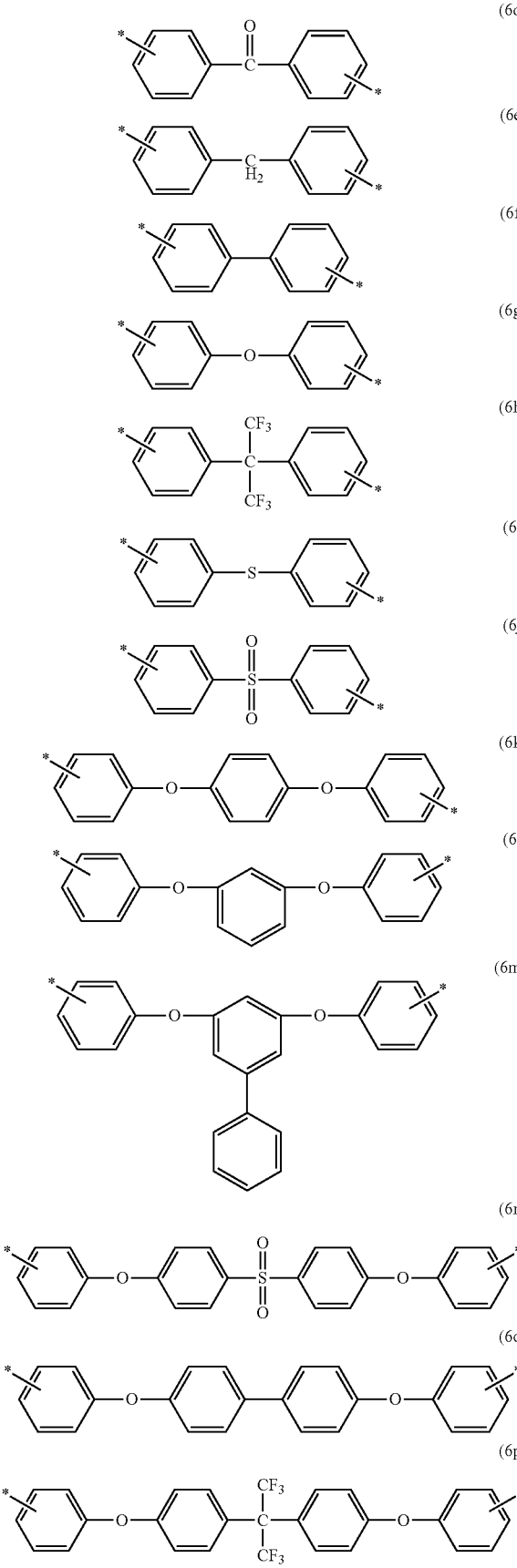

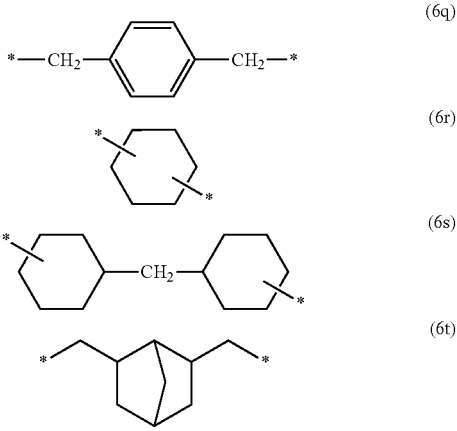

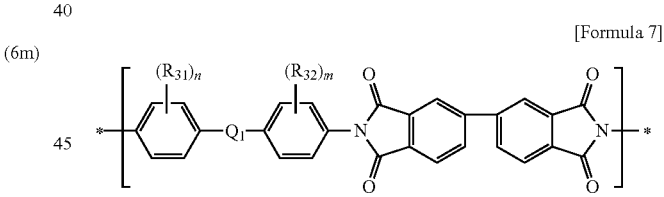

At least one hydrogen atom present in the divalent organic group of formulae 6a to 6t may be substituted with a substituent selected from a halogen atom selected from —F, —Cl, —Br and —I, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms.

According to one embodiment, the tetracarboxylic dianhydride used in the production of the polyimide contained in the flexible substrate layer may be prepared from a polymerizable component comprising a tetracarboxylic dianhydride containing a tetravalent organic group selected from formulae 1a to 1e, preferably a tetravalent organic group selected from formulae 2a to 2r.

According to one embodiment, the polyimide contained in the flexible substrate may comprise the repeating structure of the following formula 7.

[Formula 7]

In formula 7, $R_{31}$, $R_{32}$, n, m and $Q_1$ are the same as those defined in formula 5.

According to a preferred embodiment of the present invention, both the organic sacrificial layer and the flexible substrate layer may be polyimide-based. The polyimide may be prepared from a polyimide precursor (for example, polyamic acid) obtained by reacting a tetracarboxylic dianhydride with a diamine.

According to one embodiment, the tetracarboxylic dianhydride and the diamine may react at a molar ratio of 1:1.1 to 1.1:1. If the tetracarboxylic dianhydride is contained in an excess amount relative to the diamine, it may be easier to control the viscosity of the polyimide precursor solution and to improve the optical characteristics, as compared with the case where an equivalent amount or an excessive amount of diamine is reacted.

The reaction of the tetracarboxylic dianhydride with the diamine can be carried out according to the usual polymerization method of polyamic acid such as solution polymerization. Specifically, after the diamine is dissolved in an organic solvent, and then the tetracarboxylic dianhydride may be added to the resultant mixed solution to effect polymerization reaction. The reaction can be carried out under an inert gas or a nitrogen stream and can be carried out under anhydrous conditions.

The polymerization reaction may be carried out at a temperature of −20 to 60° C., preferably 0 to 45° C. If the reaction temperature is too high, the reactivity may become high, the molecular weight may become large, and the viscosity of the polyimide precursor solution may increase, which may be disadvantageous in terms of the process.

It is preferable that the polyimide precursor solution prepared according to the above-mentioned production method contains a solid content in an amount such that the solution has an appropriate viscosity in consideration of processability such as coating and application properties. According to one embodiment, the content of the composition may be controlled such that total content of the polyimide precursor solution is 5 to 20 wt %, preferably 8 to 18 wt %, more preferably 8 to 12 wt % or less.

Alternatively, the polyimide precursor solution may be adjusted to have a viscosity of 2,000 cP or more, or 3,000 cP or more. The polyimide precursor solution is preferably adjusted to have a viscosity of 10,000 cP or less, preferably 9,000 cP or less, and more preferably 8,000 or less. If the viscosity of the polyimide precursor solution exceeds 10,000 cP, the efficiency of defoaming at the time of forming the polyimide layer is lowered, and thus the efficiency of the process may be lowered. In addition, the produced film may also have poor electrical, optical and mechanical properties such as reduced surface roughness due to the formation of bubbles.

The organic solvent contained in the polyimide precursor solution of the present invention may be the same as the organic solvent used in the synthesis reaction.

Specifically, the organic solvent that can be used in the polymerization reaction may be selected from the group consisting of ketones such as γ-butyrolactone, 1,3-dimethylimidazolidinone, methyl ethyl ketone, cyclohexanone, cyclopentanone and 4-hydroxy-4-methyl-2-pentanone; aromatic hydrocarbons such as toluene, xylene and tetramethylbenzene; glycol ethers (Cellosolve) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether and triethylene glycol monoethyl ether; ethyl acetate, butyl acetate, ethylene glycol monoethyl ether acetate, ethylene glycol monobutyl ether acetate, diethylene glycol monoethyl ether acetate, dipropylene glycol monomethyl ether acetate, ethanol, propanol, ethylene glycol, propylene glycol, carbitol, dimethylacetamide (DMAc), N,N-diethylacetamide, dimethylformamide (DMF), diethylformamide (DEF), N-methylpyrrolidone (NMP), N-ethylpyrrolidone (NEP), 1,3-dimethyl-2-imidazolinone, N,N-dimethylmethoxyacetamide, dimethylsulfoxide, pyridine, dimethylsulfone, hexamethylphosphoramide, tetramethylurea, N-methylcaprolactam, tetrahydrofuran, m-dioxane, p-dioxane, 1,2-dimethoxyethane, bis(2-methoxyethyl)ether, 1,2-bis(2-methoxyethoxy)ethane, bis[2-(2-methoxyethoxy)]ether and a mixture thereof.

Preferably, the organic solvent may include a sulfoxide-based solvent such as dimethyl sulfoxide and diethyl sulfoxide, a formamide-based solvent such as N,N-dimethylformamide and N,N-diethylformamide, an acetamide-based solvent such as N,N-dimethylacetamide and N,N-diethylacetamide, a pyrrolidone-based solvent such as N-methyl-2-pyrrolidone and N-vinyl-2-pyrrolidone, a phenol-based solvent such as phenol, o-, m- or p-cresol, xylenol, halogenated phenol and catechol, or hexamethylphosphoramide, γ-butyrolactone or the like, and these solvent may be used alone or as mixture.

According to one embodiment, the organic solvent may further comprise aromatic hydrocarbons such as xylene and toluene. Also, in order to promote the dissolution of the polymer, about 50% by weight or less of an alkali metal salt or alkaline earth metal salt may be further added to the solvent, based on the total amount of the solvent.

The polyimide precursor solution may be in the form of a solution dissolved in an organic solvent. In case of the solution form, for example, when polyamic acid is synthesized in an organic solvent, the solution may be the reaction solution itself to be obtained, or the reaction solution may be diluted with another solvent. When the polyamic acid is obtained as a solid powder, it may be dissolved in an organic solvent to form a solution.

The polyamic acid obtained as a result of the polymerization reaction may then be imidized to the polyimide by chemical imidization or thermal imidization.

For example, a dehydrating agent and an imidization catalyst are added to the polymerized polyamic acid solution, then the solution is heated to a temperature of 50° C. to 100° C. and imidized by a chemical reaction, or imidized by removing alcohol from the solution under reflux, to obtain a polyimide.

In the chemical imidization method, pyridine, triethylamine, picoline or quinoline may be used as the imidization catalyst. In addition, as the imidization catalyst, a substituted or unsubstituted nitrogen-containing heterocyclic compound, a N-oxide compound of a nitrogen-containing heterocyclic compound, a substituted or unsubstituted amino acid compound, an aromatic hydrocarbon compound having a hydroxyl group, or an aromatic heterocyclic compound may be used. In particuar, lower alkyl imidazole, such as 1,2-dimethylimidazole, N-methylimidazole, N-benzyl-2-methylimidazole, 2-methylimidazole, 2-ethyl-4-methylimidazole and 5-methylbenzimidazole, a imidazole derivative such as N-benzyl-2-methylimidazole, isoquinoline, substituted pyridine, such as 3,5-dimethylpyridine, 3,4-dimethylpyridine, 2,5-dimethylpyridine, 2,4-dimethylpyridine and 4-n-propylpyridine, p-toluenesulfonic acid and the like may also be used.

As the dehydrating agent, an acid anhydride such as acetic anhydride may be used.

Alternatively, imidization can be carried out by applying the polyimide precursor solution containing the polyamic acid onto a substrate and then heat treating it.

Specifically, the imidization and curing of polyimide is performed by applying a polyimide precursor solution to a substrate and heat-treating the substrate in an IR oven, in a hot-air oven, or on a hot plate, wherein the heat treatment temperature is 300° C. to 500° C., preferably 320° C. to 480° C. and the heat treatment may be performed in a multi-stage heating process within the above temperature range. The heat treatment process may be performed for 20 to 70 min, and preferably for 20 to 60 min.

In the present invention, a silane coupling agent, a crosslinkable compound, an imidization promoter for efficiently advancing imidization, and the like may be added, provided that the effect of the invention is not impaired.

Hereinafter, embodiments of the present invention will be described in detail so that those skilled in the art can easily carry out the present invention. The present invention may, however, be embodied in many different forms and should not be construed as limited to the embodiments set forth herein.

Example 1

On one side of the alkali-free glass as a carrier substrate, a composition comprising 3% by weight of a polyamic acid resin obtained by polymerizing 1 mol of BPDA (3,3,4,4'-biphenyltetracarboxylic dianhydride) and 0.99 mol of DABA (4,4'-diaminobenzanilide) and 97% by weight of DMAc (dimethylacetamide) as a solvent was applied to a thickness of 0.05 μm after drying.

The resulting coating was continuously subjected to a drying step at 120° C. and a curing step at 250° C. to form an organic sacrificial layer containing a polyimide resin.

Subsequently, on the organic sacrificial layer, a composition comprising 12% by weight of a polyamic acid resin obtained by polymerizing 1 mol of BPDA and 0.99 mol of TFMB (2,2'-bis(trifluoromethyl)-4,4'-biphenyl diamine) and 88% by weight of DMAc as a solvent was applied to a thickness of 10 μm after drying. The resulting coating was continuously subjected to a drying step at 100° C. and a curing step at 300° C. for 60 minutes to form a polymer layer for a flexible substrate. As a result, a laminate in which the carrier substrate, the organic sacrificial layer containing a BPDA-DABA polyimide resin, and the polymer layer containing a BPDA-TFMB polyimide resin as a flexible substrate were sequentially laminated was prepared.

Example 2

On one side of the alkali-free glass as a carrier substrate, a composition comprising 3% by weight of a polyamic acid resin obtained by polymerizing 1 mol of BPDA and 0.99 mol of DATA of the following structure and 97% by weight of DMAc as a solvent was applied to a thickness of 0.05 μm after drying.

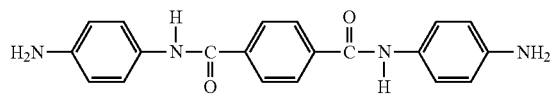

DATA

The resulting coating was continuously subjected to a drying step at 120° C. and a curing step at 250° C. to form an organic sacrificial layer containing a polyimide resin.

Subsequently, on the organic sacrificial layer, a composition comprising 12% by weight of a polyamic acid resin obtained by polymerizing 1 mol of BPDA and 0.99 mol of TFMB and 88% by weight of DMAc as a solvent was applied to a thickness of 10 μm after drying. The resulting coating was continuously subjected to a drying step at 100° C. and a curing step at 300° C. for 60 minutes to form a polymer layer for a flexible substrate. As a result, a laminate in which the carrier substrate, the organic sacrificial layer containing a BPDA-DATA polyimide resin, and the polymer layer containing a BPDA-TFMB polyimide resin as a flexible substrate were sequentially laminated was prepared.

Comparative Example 1

On one side of the alkali-free glass as a carrier substrate, a composition comprising 12% by weight of a polyamic acid resin obtained by polymerizing 1 mol of BPDA and 0.99 mol of TFMB and 88% by weight of DMAc as a solvent was applied to a thickness of 10 μm after drying. The resulting coating was continuously subjected to a drying step at 100° C. and a curing step at 300° C. for 60 minutes to form a polymer layer for a flexible substrate.

As a result, a film in which the carrier substrate and the polymer layer containing a BPDA-TFMB polyimide resin as a flexible substrate were formed was prepared.

Comparative Example 2

On one side of the alkali-free glass as a carrier substrate, a composition comprising 3% by weight of a polyamic acid resin obtained by polymerizing 1 mol of BPDA and 0.99 mol of PDA (p-phenylene diamine) and 97% by weight of DMAc as a solvent was applied to a thickness of 0.05 μm after drying.

Subsequently, on the organic sacrificial layer, a composition comprising 12% by weight of a polyamic acid resin obtained by polymerizing 1 mol of BPDA and 0.99 mol of TFMB and 88% by weight of DMAc as a solvent was applied to a thickness of 10 μm after drying. The resulting coating was continuously subjected to a drying step at 100° C. and a curing step at 300° C. for 60 minutes to form a polymer layer for a flexible substrate.

Experimental Example 1: Evaluation of Delamination by Laser Irradiation

The laminate prepared in Examples 1 and 2 and Comparative Examples 1 and 2 was subjected to evaluation of delamination by a laser having a wavelength of 308 nm using a laser equipment (Korea Semiconductor System).

In the evaluation of delamination, the laminate was turned upside down with the glass surface facing up, and the laser is irradiated while gradually increasing the laser energy density from 100 mJ/cm$^2$. A delamination energy was defined as the energy for delaminating the polyimide (PI) layer.

After the film was delaminated, the surface irradiated with the laser was cleaned with a clean wiper, and the area smeared with ash was measured. With respect to the area of 1 cm×1 cm, when less than 30% of the area is smeared, it is evaluated as ○, when 30 to 70% of the area is smeared, it is evaluated as Δ, and when 70% or more of the area is smeared, it is evaluated as X. The results are shown in Table 1 below.

TABLE 1

|  | Delamination Energy (mJ/cm$^2$) | Ash |
|---|---|---|
| Example 1 | 180 | ○ |
| Example 2 | 180 | ○ |
| Comparative Example 1 | 280 | X |
| Comparative Example 2 | 230 | Δ |

As can be seen from Table 1, the laminate according to Example 1 and Example 2 exhibits a much lower delamination energy of the laser at which the flexible substrate is delaminated than that in Comparative Example 1. From this, it can be confirmed that ash is not generated by the delamination process. Also, in the case of Comparative Example 2, it can be seen that delamination is observed at a lower energy than that of Comparative Example 1, but ash is still remained.

While the present invention has been particularly shown and described with reference to specific embodiments thereof, it will be apparent to those skilled in the art that this specific descriptions is merely a preferred embodiment and that the scope of the invention is not limited thereby. It is therefore intended that the scope of the invention be defined by the claims appended hereto and their equivalents.

What is claimed is:

1. A laminate for manufacturing a flexible substrate comprising:
   a carrier substrate;
   an organic sacrificial layer disposed on one side of the carrier substrate and containing a polyimide resin having an amide bond (—C(O)NH—) in the molecular structure; and
   a flexible substrate layer disposed on the organic sacrificial layer,
   wherein the adhesion of the organic sacrificial layer to the flexible substrate layer is reduced by a UV laser,
   wherein the polyimide is formed from at least one diamine selected from the following formulae 3a to 3c and at least one tetracarboxylic anhydride:

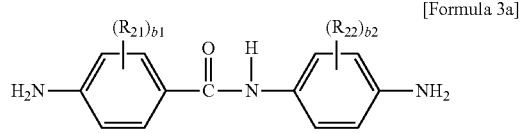

[Formula 3a]

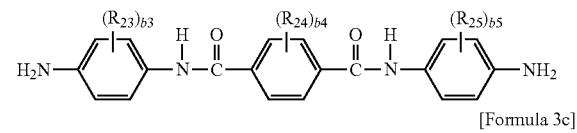

[Formula 3b]

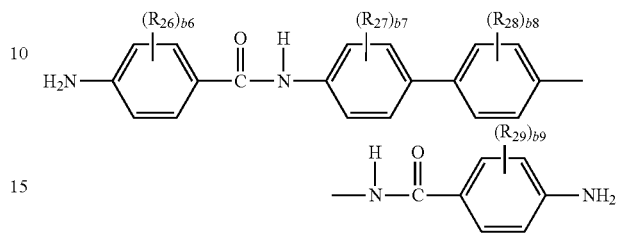

[Formula 3c]

in formulae 3a to 3c,
$R_{21}$ to $R_{29}$ are each independently a substituent selected from a halogen atom, a thiol group (—SH), a nitro group (—NO$_2$), a cyano group (—CN), an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms,
$b_1$ to $b_9$ are each independently an integer of 0 to 4, and
wherein an energy density (E/D) of a UV laser at which the adhesion of the organic sacrificial layer to the carrier substrate changes is 220 mJ/cm$^2$ or less.

2. The laminate for manufacturing a flexible substrate according to claim 1, wherein the organic sacrificial layer containing the polyimide resin has a UV transmittance of 30% or less at a wavelength of 200 nm to 350 nm when the thickness is 100 nm.

3. The laminate for manufacturing a flexible substrate according to claim 1, wherein the polyimide contained in the organic sacrificial layer comprises at least one repeating structure selected from the following formulae 4a to 4c:

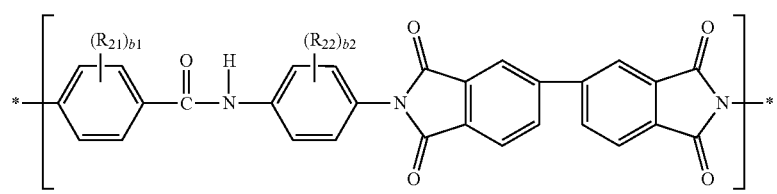

[Formula 4a]

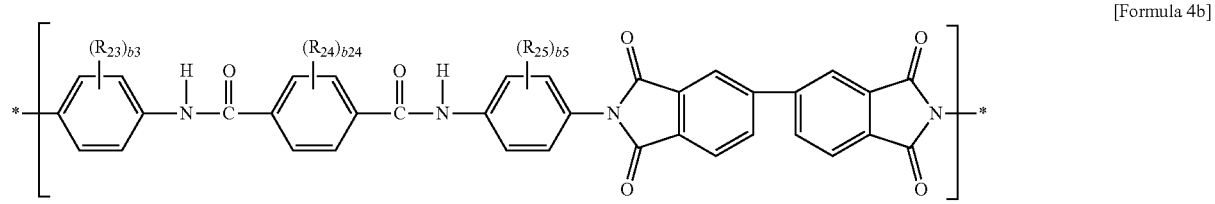

[Formula 4b]

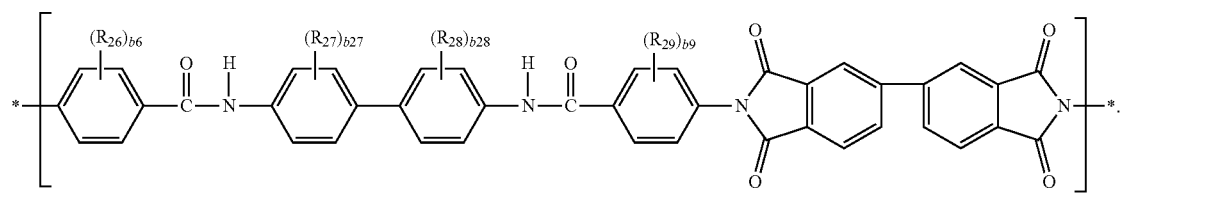

[Formula 4c]

4. The laminate for manufacturing a flexible substrate according to claim 1, wherein the flexible substrate contains a polyimide.

5. The laminate for manufacturing a flexible substrate according to claim 4, wherein the polyimide contained in the flexible substrate further comprises a diamine of the following formula 5:

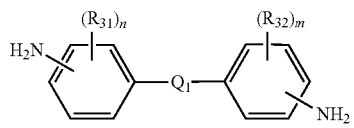

[Formula 5]

in formula 5,
R$_{31}$ and R$_{32}$ are each independently a substituent selected from a halogen atom, a hydroxyl group (—OH), a thiol group (—SH), a nitro group (—NO$_2$), a cyano group, an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms,
n and m are each independently an integer of 0 to 4, and
Q$_1$ is selected from the group consisting of a single bond, —O—, —CR$_{18}$R$_{19}$—, —C(=O)—, —C(=O)O—, —S—, —SO$_2$—, a phenylene group and a combination thereof, wherein R$_{18}$ and R$_{19}$ are each independently selected from the group consisting of a hydrogen atom, an alkyl group having 1 to 10 carbon atoms, and a fluoroalkyl group having 1 to 10 carbon atoms.

6. The laminate for manufacturing a flexible substrate according to claim 5, wherein the polyimide contained in the flexible substrate comprises a repeating structure of the following formula 7:

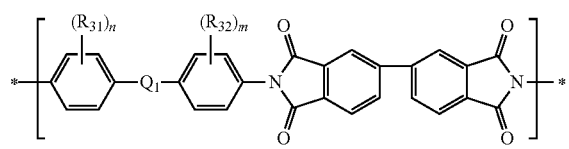

[Formula 7]

in formula 7, R$_{31}$, R$_{32}$, n, m and Q1 are the same as those defined in formula 5.

7. The laminate for manufacturing a flexible substrate according to claim 1, wherein the laminate further comprises, on the organic sacrificial layer, at least one functional additional layer selected from the group of a barrier layer and a metal layer.

8. The laminate for manufacturing a flexible substrate according to claim 1, wherein the polyimide contained in the organic sacrificial layer has a coefficient of thermal expansion (CTE) of 0 to 20 ppm/° C. in the temperature range of 30 to 500° C.

9. A method of manufacturing a flexible substrate, comprising the steps of:
applying and coating a polyimide precursor solution comprising an amide bond (—C(O)NH—) in the molecular structure on a carrier substrate to form an organic sacrificial layer containing a polyimide;
forming a flexible substrate layer on the organic sacrificial layer by using a UV laser; and
performing laser lift-off for delaminating the flexible substrate layer from the carrier substrate on which the organic sacrificing layer is formed,
wherein the polyimide is formed from at least one diamine selected from the following formulae 3a to 3c and at least one tetracarboxylic anhydride:

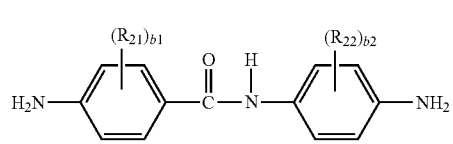

[Formula 3a]

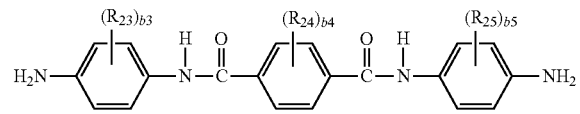

[Formula 3b]

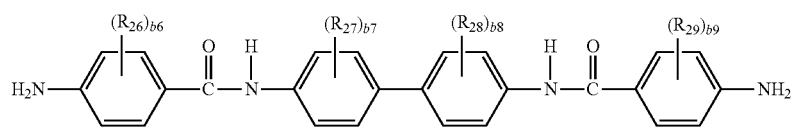

[Formula 3ac]

in formulae 3a to 3c,
R$_{21}$ to R$_{29}$ are each independently a substituent selected from a halogen atom, a thiol group (—SH), a nitro group (—NO2), a cyano group (—CN), an alkyl group having 1 to 10 carbon atoms, a halogenoalkoxy group having 1 to 4 carbon atoms, a halogenoalkyl group having 1 to 10 carbon atoms and an aryl group having 6 to 20 carbon atoms,
b$_1$ to b$_9$ are each independently an integer of 0 to 4, and
wherein an energy density (E/D) of a UV laser at which the adhesion of the organic sacrificial layer to the carrier substrate changes is 220 mJ/cm$^2$ or less.

10. The method of manufacturing a flexible substrate according to claim 9, wherein the method further comprises forming, on the organic sacrificial layer, at least one functional additional layer selected from the group of a barrier layer and a metal layer.

* * * * *